US011402302B2

(12) United States Patent
Willich et al.

(10) Patent No.: US 11,402,302 B2
(45) Date of Patent: Aug. 2, 2022

(54) EXHAUST GAS SAMPLE TAKING SYSTEM

(71) Applicant: AVL EMISSION TEST SYSTEMS GMBH, Neuss (DE)

(72) Inventors: Sascha Willich, Korschenbroich (DE); Marcus Wolff, Krefeld (DE)

(73) Assignee: AVL EMISSION TEST SYSTEMS GMBH, Neuss (DE)

( * ) Notice: Subject to any disclaimer, the term of this patent is extended or adjusted under 35 U.S.C. 154(b) by 190 days.

(21) Appl. No.: 16/757,769

(22) PCT Filed: Sep. 21, 2018

(86) PCT No.: PCT/EP2018/075582
§ 371 (c)(1),
(2) Date: Apr. 21, 2020

(87) PCT Pub. No.: WO2019/081140
PCT Pub. Date: May 2, 2019

(65) Prior Publication Data
US 2020/0319064 A1    Oct. 8, 2020

(30) Foreign Application Priority Data

Oct. 23, 2017  (DE) .................... 10 2017 124 699.1

(51) Int. Cl.
*G01N 1/22*     (2006.01)
*F16K 7/07*     (2006.01)
*G01N 1/24*     (2006.01)

(52) U.S. Cl.
CPC ............ *G01N 1/2252* (2013.01); *F16K 7/07* (2013.01); *G01N 1/24* (2013.01); *G01N 2001/244* (2013.01)

(58) Field of Classification Search
CPC .. G01N 1/2252; G01N 1/24; G01N 2001/244; G01N 2001/2255; G01N 1/22; G01N 1/2247; F16K 7/07
(Continued)

(56) References Cited

U.S. PATENT DOCUMENTS

| 4,586,873 A | 5/1986 | Lepretre et al. |
| 5,242,404 A | 9/1993 | Conley et al. |

(Continued)

FOREIGN PATENT DOCUMENTS

| CN | 2811280 | * 12/2014 |
| CN | 104034561 | * 1/2018 |

(Continued)

OTHER PUBLICATIONS

Company Website Ako Armaturen: "Pneumatische Quetschventile", https://web.archive.org/web/20161016014951/http://www.ako-armaturen.de/produkte/pneumatische-quetschventile.html, (retrieved Apr. 22, 2022), together with English Version "Air operated Pinch Valve, https://www.pinch-valve.com/products/air-operated-pinch-valves.html", p. 1 (Oct. 16, 2016).

*Primary Examiner* — Robert R Raevis
(74) *Attorney, Agent, or Firm* — Norman B. Thot

(57) ABSTRACT

An exhaust gas sampling system includes a main conveying line, a main throughput pump which conveys a sample gas in the main conveying line, a first Venturi nozzle, a second Venturi nozzle, a first control valve, and a second control valve. The first Venturi nozzle and the second Venturi nozzle are connected in parallel and are arranged in the main conveying line upstream of the main throughput pump. The first Venturi nozzle is assigned the first control valve. The second Venturi nozzle is assigned the second control valve. Each of the first control valve and the second control valve are provided as a pinch valve. Each pinch valve has a flexible, hose-like control element and a pressure chamber (Continued)

which is filled with a fluid and which is arranged to surround the flexible, hose-like control element.

9 Claims, 2 Drawing Sheets

(58) Field of Classification Search
USPC .......... 73/23.31, 1.25, 1.26, 863.31, 863.41, 73/863.51, 863.58, 863.81, 864, 864.34, 73/864.73
See application file for complete search history.

(56) References Cited

U.S. PATENT DOCUMENTS

| | | | |
|---|---|---|---|
| 2003/0013199 A1* | 1/2003 | Anderson | G01N 1/16 422/62 |
| 2003/0176833 A1 | 9/2003 | Libermann | |
| 2005/0217391 A1* | 10/2005 | Gamache | F17D 3/10 73/863 |
| 2008/0202196 A1 | 8/2008 | Richardson | |
| 2009/0266363 A1* | 10/2009 | Clemensen | A61M 16/0833 128/207.16 |
| 2014/0290336 A1 | 10/2014 | Miyai | |
| 2014/0352404 A1 | 12/2014 | Kumagai et al. | |

FOREIGN PATENT DOCUMENTS

| | | | |
|---|---|---|---|
| DE | 4317867 | * | 12/1994 |
| DE | 60204737 | * | 5/2006 |
| DE | 102017103487 | * | 1/2018 |
| EP | 2 811 280 A1 | | 12/2014 |
| GB | 2 430 255 A | | 3/2007 |
| JP | H05-337150 A | | 12/1993 |
| JP | H10-104134 A | | 4/1998 |
| JP | H11-173961 A | | 7/1999 |
| JP | 3050719 | * | 6/2000 |
| JP | 2004-504114 A | | 2/2004 |
| JP | 2004-131189 A | | 4/2004 |
| JP | 2014-196969 A | | 10/2014 |
| JP | 2014-235101 A | | 12/2014 |
| WO | WO 02/07798 A2 | | 1/2002 |

* cited by examiner

EXHAUST GAS SAMPLE TAKING SYSTEM

CROSS REFERENCE TO PRIOR APPLICATIONS

This application is a U.S. National Phase application under 35 U.S.C. § 371 of International Application No. PCT/EP2018/075582, filed on Sep. 21, 2018 and which claims benefit to German Patent Application No. 10 2017 124 699.1, filed on Oct. 23, 2017. The International Application was published in German on May 2, 2019 as WO 2019/081140 A1 under PCT Article 21(2).

FIELD

The present invention relates to an exhaust gas sampling system comprising a main conveying line, a main throughput pump via which a sample gas is conveyable in the main conveying line, and at least one first Venturi nozzle and one second Venturi nozzle, wherein the first Venturi nozzle and the second Venturi nozzle are connected in parallel and arranged in the main conveying line upstream to the main throughput pump, and wherein the first Venturi nozzle is assigned a first control valve and the second Venturi nozzle is assigned a second control valve.

BACKGROUND

Most countries have emission regulations which stipulate that a type approval is required before a vehicle is sold. The type approval serves for examining and approving a type of combustion engine or a type of vehicle in terms of the emitted amount of pollutants. Emission regulations stipulate, among other things, how the exhaust gas measurement is carried out. Two different measuring methods generally exist in this regard. In the first measuring method, the undiluted exhaust gas emitted by the combustion engine is analyzed and, with knowledge of the exhaust gas volume flows, the mass of pollutants is determined. In the second measuring method, the exhaust gas emitted by the combustion engine is diluted with air by conducting the exhaust gas into a so-called CVS (constant volume sapling) system. In the CVS system, the volume flow of the diluted exhaust gas is maintained constant by a Venturi nozzle, wherein, due to the difference between the variable exhaust gas volume flow introduced into the CVS system and the constant volume flow of the diluted exhaust gas, more or less air is sucked into the CVS system, so that the exhaust gas is diluted more or less depending on the exhaust gas volume flow. The exhaust gas is diluted more for a low exhaust gas flow, and the exhaust gas is diluted less for a high exhaust gas volume flow. A proportionality between the pollutant concentration of the diluted exhaust gas and the product of the undiluted exhaust gas concentration of the total exhaust gas volume flow is thereby reached. During the entire driving cycle, a small amount of the diluted exhaust gas is conducted into an exhaust gas bag and is collected therein. The diluted exhaust gas collected in the exhaust gas bag is analyzed, wherein the pollutant concentration of the diluted exhaust gas is determined and, with knowledge of the total exhaust gas volume flow, the exhaust gas emission masses of the different pollutants contained in the exhaust gas are determined, for example, of carbon dioxide, carbon monoxide, hydrocarbon, and nitrogen oxide.

EP 2 811 280 A1, for example, describes such a CVS system comprising a dilution tunnel having an exhaust gas inlet and an air inlet. A sample of the diluted exhaust gas is taken by a sampling probe protruding into the dilution tunnel and is conducted via a sampling line into an exhaust gas bag. Four exhaust lines extend downstream of the dilution tunnel which are separated from each other and which are connected in parallel. One Venturi nozzle and one control valve are respectively arranged in each exhaust line, wherein one respective control valve is assigned to one Venturi nozzle. The required dilution varies depending on the combustion engine to be examined. The individual exhaust lines can be deactivated or activated by the control valves, whereby the volume flow of the diluted exhaust gas can be adjusted depending on the combustion engine to be examined.

Flap valves which can be operated pneumatically are generally used as control valves. A disadvantage of an exhaust gas sampling system with such control valves is that the designing thereof is complex and cost-intensive, which in turn increases the manufacturing costs of the exhaust gas sampling system. Control valves designed in this way also require a very large installation space.

SUMMARY

An aspect of the present invention is to further develop an exhaust gas sampling system and/or the control valves so that the installation space and the weight of the control valves and thus of the exhaust gas sampling system are reduced, and so that the control valves and/or the exhaust gas sampling system can be manufactured in a simple and cost-effective manner.

In an embodiment, the present invention provides an exhaust gas sampling system which includes a main conveying line, a main throughput pump which is configured to convey a sample gas in the main conveying line, a first Venturi nozzle, a second Venturi nozzle, a first control valve, and a second control valve. The first Venturi nozzle and the second Venturi nozzle are connected in parallel and are arranged in the main conveying line upstream of the main throughput pump. The first Venturi nozzle is assigned the first control valve. The second Venturi nozzle is assigned the second control valve. Each of the first control valve and the second control valve are provided as a pinch valve. Each pinch valve comprises a flexible, hose-like control element and a pressure chamber which is configured to be filled with a fluid and which is arranged to surround the flexible, hose-like control element.

BRIEF DESCRIPTION OF THE DRAWINGS

The present invention is described in greater detail below on the basis of embodiments and of the drawings in which.

DETAILED DESCRIPTION

Figure 1:
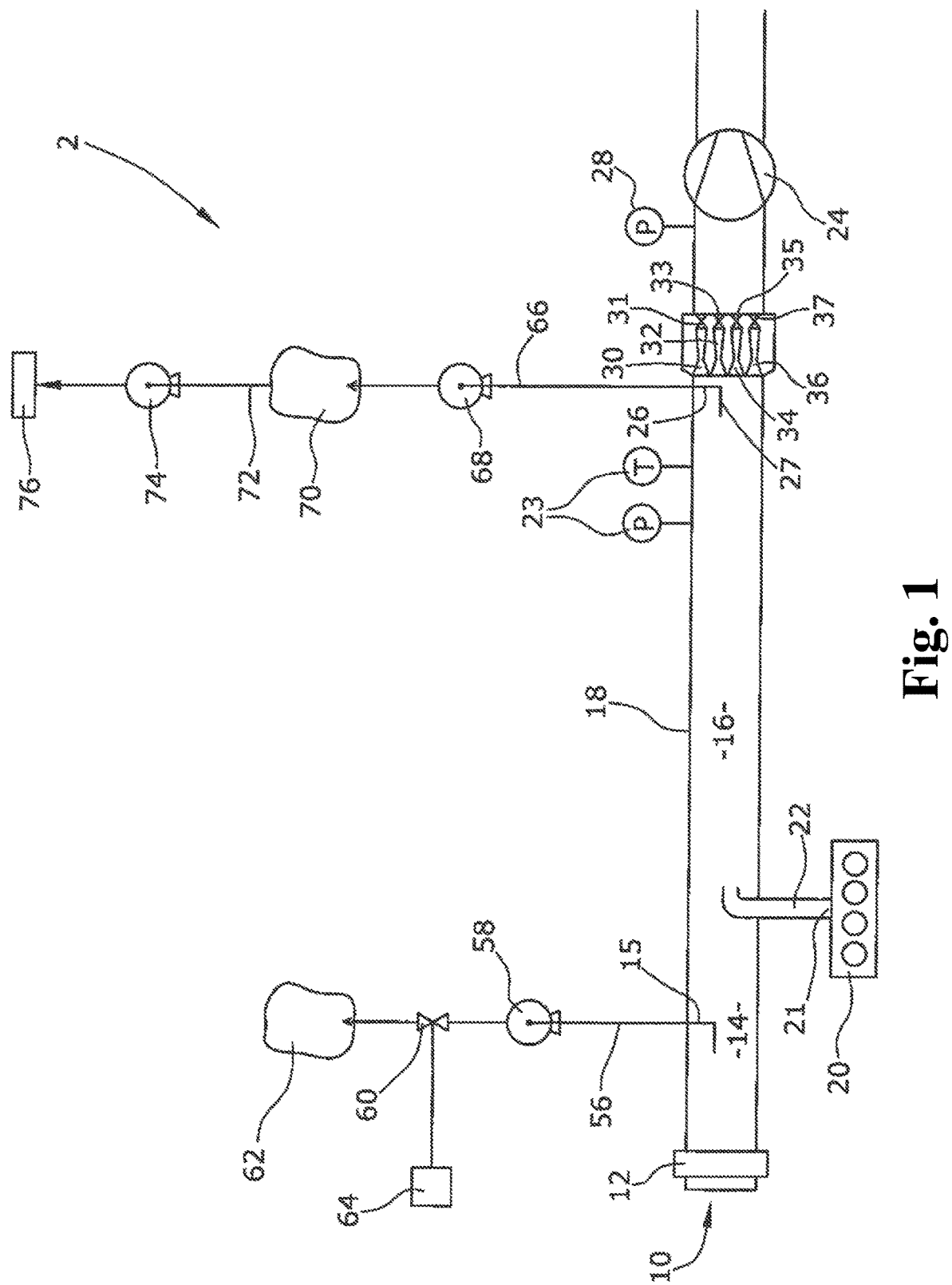
FIG. 1 schematically shows an exhaust gas sampling system according to the present invention in the form of a flow scheme.

Since the control valves are realized as pinch valves, wherein each control valve comprises a flexible, hose-like control element and a pressure chamber surrounding the control element, wherein the pressure chamber is adapted to be filled with a fluid, a simply structured and simply functioning control valve is created which comprises a reduced installation space and a reduced weight. The installation space, the weight, as well as the manufacturing costs of the exhaust gas sampling system are thereby reduced.

The control element is made of a highly elastic elastomer which is arranged centrally in a valve housing and mounted at both respective ends via a flange or a sleeve to the valve housing. The valve housing and the outer circumferential surface of the control element delimit the pressure chamber. By supplying a fluid into the pressure chamber, the control element is deformed so that the flow-through opening formed by the undeformed control element is blocked and the flow-through cross-section of the control valve is closed. For opening the control valve, the pressure chamber is vented and/or emptied, wherein, due to its elasticity, the control element completely deforms back to the undeformed initial state in which the flow-through opening is opened.

The control valves can, for example, be realized as pneumatic pinch valves, wherein the pressure chamber of the respective control valve is in fluid connection with a compressed air line. The control valve can thus be operated in a simple and cost-effective manner.

In an embodiment of the present invention, the compressed air line can, for example, comprise a pressure switch. The switching state of the control valve can thus be determined in a cost-effective manner, wherein the pressure switch only detects whether the pressure chamber is filled with the fluid or is vented. A failure of the compressed air source can thus, for example, be determined.

In an embodiment of the present invention, the pressure chamber can, for example, be adapted to be connected via a compressed air line either to a pressure chamber or a vacuum chamber. When the pressure chamber is connected to the vacuum chamber, a pressure difference between the pressure chamber and the main conveying line occurs such that the control valve is loaded radially outward and a reliable opening of the pinch valve is provided.

In an embodiment of the present invention, the control valves can, for example, be realized as hydraulic pinch valves, wherein the pressure chamber is adapted to be filled with a liquid. An improved sealing in the closed state of the control valve is thus achieved.

In an embodiment of the present invention, the flow-through cross-section of the first Venturi nozzle can, for example, be adapted to be larger than the flow-through cross-section of the second Venturi nozzle so that more than two constant volume flows of the diluted exhaust gas are adjustable in a simple manner via either the first control valve being open and the second control valve being closed, the second control valve being open and the first control valve being closed, or both control valves being open.

In an embodiment of the present invention, in an open position of the control valve, the hose-like control element can, for example, connect flush to the pipe sections connecting thereto. Flow losses are thus prevented.

In an embodiment of the present invention, the inner diameter of the control element in the open position of the control valve can, for example, correspond to the inner diameter of the pipe sections connecting thereto. Flow losses in the open position of the control valve are thus prevented.

In an embodiment of the present invention, four Venturi nozzles connected in parallel can, for example, be provided with one respective control valve. The four Venturi nozzles connected in parallel can, for example, comprise different diameters.

Fifteen (15) different constant volume flows of the diluted exhaust gas can thus be adjusted. Such an exhaust gas sampling system can thereby be used for the exhaust gas measurement of a plurality of different combustion engines.

In an embodiment of the present invention, the control valves can, for example, be arranged downstream to the Venturi nozzle, whereby a disadvantageous flow interference of the diluted exhaust gas close to the sample gas withdrawal is prevented.

An exhaust gas sampling system is thus provided which comprises control valves that can be manufactured in a simple and cost-effective manner and which has a small installation space and a reduced weight.

An embodiment of the present invention will be described in greater detail below under reference to the accompanying drawings.

The exhaust gas sampling system 2 according to the present invention includes an air inlet 10 at which an air filter 12 is arranged. The air enters into an air channel 14, into which an air sampling probe 15 protrudes, via which air samples are continuously taken during the measurement. The air channel 14 enters a mixing zone 16 where the air is homogenously mixed with exhaust gas from an exhaust gas source 20 which is connected to an exhaust gas inlet 21 entering into an exhaust gas channel 22. The mixing zone 16 is the first section of a main conveying line 18 through which a sample gas, consisting of air and exhaust gas, flows. In the main conveying line 18, means for conditioning the sample gas can be arranged, such as a heat exchanger for adjusting a fixed temperature of the sample gas. Measuring devices 23 are also arranged in main conveying line 18 which serve to measure temperature and pressure within main conveying line 18 and thus for the measurement of the volume flow in main conveying line 18. The sample gas is conveyed via a main throughput pump 24.

One or more sampling probes 27, via which a representative sample of the sample gas can be taken, protrude into main conveying line 18. The main throughput pump 24 provides a sufficient throughput in main conveying line 18. A pressure measuring device 28, via which the pressure upstream of main throughput pump 24 is measured, is arranged directly before main throughput pump 24.

Four Venturi nozzles 30, 32, 34, 36 are arranged in the main conveying line 18 between sampling probe 27 and main throughput pump 24 in the flow direction. The Venturi nozzles 30, 32, 34, 36 are operated in the supercritical range, wherein the supercritical range is provided by the main throughput pump 24. The flow-through of the Venturi nozzles 30, 32, 34, 36 follows the laws of fluid mechanics, so that a constant volume flow of the sample gas is adjusted by the Venturi nozzles 30, 32, 34, 36 in case of a sufficient conveying pressure.

Upon examination of various combustion engines, the exhaust gas volume flow emitted by exhaust gas source 20 and introduced into main conveying line 18 varies due to different dimensions of the combustion engines. For a small exhaust gas volume flow, the proportion of the exhaust gas in the sample gas decreases, so that the pollutant concentration in the sample gas can drop below a critical value where a reliable pollutant measurement is no longer possible. In a large exhaust gas volume flow, the proportion of the exhaust gas in the sample gas increases, so that a condensation of the water vapor diluted in the exhaust gas takes place and the measurement results are falsified.

In order to achieve an optimum ratio between the amount of exhaust gas and the amount of air in the sample gas, four Venturi nozzles 30, 32, 34, 36 connected in parallel are arranged in the main conveying line, wherein each Venturi nozzle 30, 32, 34, 36 is respectively assigned one control valve 31, 33, 35, 37.

Each control valve 31, 33, 35, 37 can be adjusted between and an open and a closed position, whereby the constant volume flow of the sample gas can be adjusted for the exhaust gas measurement as needed. The four Venturi nozzles 30, 32, 34, 36 also comprise different flow-through cross-sections so that, by closing or opening the corresponding respective control valves 31, 33, 35, 37 in combination with the different flow-through cross-sections of the Venturi nozzles 30, 32, 34, 36, fifteen (15) different volume flows of the sample gas can be adjusted.

Figure 2:
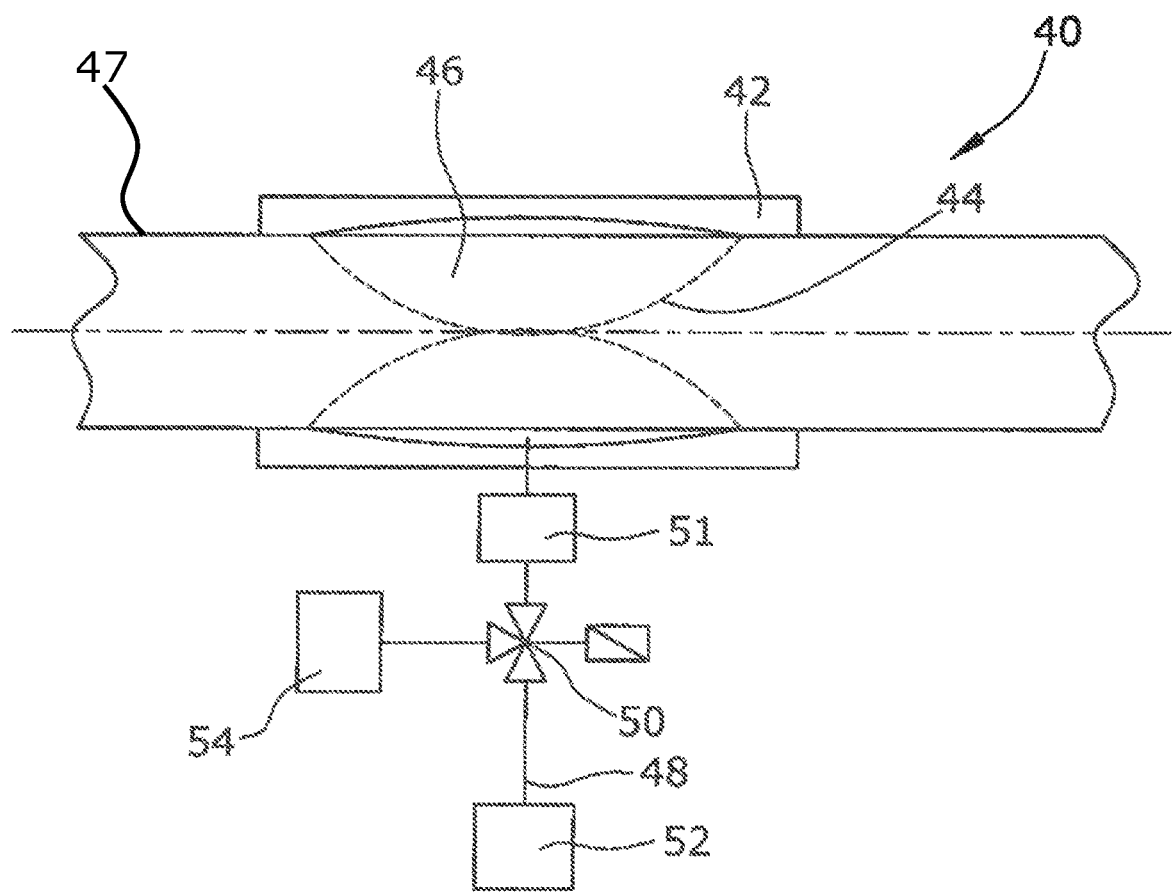
FIG. 2 shows a schematic representation of a control valve of the exhaust gas sampling system illustrated in FIG. 1.

According to the present invention, the control valves 31, 33, 35, 37 are realized as pinch valves 40. Such a pinch valve 40 is schematically shown in FIG. 2, wherein the open position is illustrated by a solid line and the closed position by a dotted line. The pinch valve 40 is realized as a pneumatic pinch valve 40 and comprises a valve housing 42 in which a hose-like and highly elastic control element 44 is arranged which is made, for example, of a highly elastic elastomer. A pressure chamber 46 is also provided in valve housing 42 which is delimited by control element 44 and valve housing 42. The pressure chamber 46 is adapted to be in fluid communication via a compressed air line 48 and a control valve 50 arranged in compressed air line 48 either with a pressure chamber 52 or with a vacuum chamber 54. The compressed air line 48 further comprises a pressure switch 51 through which the switching state of pinch valve 40 is detected.

In the closed position of pneumatic pinch valve 40, pressure chamber 46 is filled with compressed air, wherein the control element 44 is uniformly deformed radially inward and the flow-through cross-section of pinch valve 40 is closed. When switching from the closed position to the open position of pinch valve 40, pressure chamber 46 is vented and is in fluid communication with vacuum chamber 54, wherein the highly elastic control element 44 deforms into the initial position due to its elasticity, for example, to be flush with a pipe section 47. Because of the fluid communication of pressure chamber 46 with vacuum chamber 54, the pressure in pressure chamber 46 is lower than in main conveying line 18, so that control element 44 is loaded radially outward by the pressure difference and a reliable opening of pinch valve 40 is provided.

The sample gas is conveyed via the at least one sampling probe 27 and/or via sample gas withdrawal line 26 via a sample gas conveying pump 68 through a sample gas withdrawal line 66 into one or more sample gas bags 70.

The sample gas bag(s) 70 is further connected via a sample gas analysis line 72, in which a sample gas conveying device 74 is arranged, to one or more analyzers 76. The pollutants in the exhaust gas are determined in the analyzer(s) 76, particularly the amount of hydrocarbons, carbon dioxide, carbon monoxide, and nitrogen oxides.

The air withdrawn via air sampling probe 15 is conveyed via an air sample line 56 via an air conveying pump 58 into an air bag 62. A flow-through regulator 60 connected to a flow-through measuring device 64 is arranged in air sample line 56 in order to be able to withdraw the air in a constant and clean manner. The air collected in air bag 62 is analyzed in terms of the pollutant concentration, and the pollutant concentration of the sample gas is corrected by the determined value of the pollutant concentration.

The exhaust gas sampling system 2 is operated so that a test cycle starts when switching on exhaust gas source 20. At this time, main throughput pump 24 conveys the sample gas through main conveying line 18, wherein in case of sufficient conveying pressure and through the Venturi nozzles 30, 32, 34, 36, a constant volume flow is reached. The individual Venturi nozzles 30, 32, 34, 36 are activated and deactivated by the respective control valves 31, 33, 35, 37 as needed, whereby a volume flow required for the measurement is reached. The control valves 31, 33, 35, 37 realized as pneumatic pinch valves 40 are thereby each in fluid communication with a pressure chamber 52 in the closed position via a compressed air line 48, whereby pressure chamber 46 is filled with compressed air, the control element 44 deforms radially inward and the flow-through cross-section of pinch valve 40 is closed. In the open position of the individual control valves 31, 33, 35, 37, pressure chamber 46 of the respective pinch valve 40 is vented and connected to a vacuum chamber 54, whereby the pressure in pressure chamber 46 is lower than in main conveying line 18, so that the control element 44 is deformed due to the elasticity of control element 44 and the pressure prevailing in pressure chamber 46, and the flow-through cross-section of pinch valve 40 is opened. The switch position of the control valves 31, 33, 35, 37 is determined by one respective pressure switch 51.

Via air sampling probe 15, a sample air flow is transported from air channel 14 via air sample line 56 by air conveying pump 58 to air bag 62. The sample gas is at the same time conveyed via one or several sampling probes 27 via sample gas conveying pump 68 through sample gas withdrawal line 66 to the one or to several sample gas bags 70. Sample gas conveying pump 68 is turned off upon completion of the test cycle. The sample gas conveying device 74 is also turned on in this second step so that the collected sample gas is conveyed from the sample gas bag 70 through sample gas analysis line 72 to analyzer 76. Main throughput pump 24 continues in operation during this process in order to suck off remaining exhaust gas in main conveying line 18.

An exhaust gas sampling system is thus provided which comprises control valves that can be manufactured in a simple and cost-effective manner and comprise a small installation space and a reduced weight.

It should be apparent that the scope of protection of the present invention is not limited to the described exemplary embodiment. Reference should also be had to the appended claims.

What is claimed is:

1. An exhaust gas sampling system comprising:
   a conveying line;
   a throughput pump which is configured to convey a sample gas in the conveying line;
   a first Venturi nozzle;
   a second Venturi nozzle;
   a first control valve; and
   a second control valve,
   wherein,
   the first Venturi nozzle and the second Venturi nozzle are connected in parallel and are arranged in the conveying line upstream of the throughput pump,
   the first Venturi nozzle is assigned the first control valve,
   the second Venturi nozzle is assigned the second control valve,
   each of the first control valve and the second control valve are provided as a pinch valve, each pinch valve comprising a flexible, hose-like control element and a pressure chamber which is configured to be filled with a fluid and which is arranged to surround the flexible, hose-like control element,
   each pinch valve is a pneumatic pinch valve,
   the pressure chamber of each of the first control valve and the second control valve is in fluid communication with a respective compressed air line, and each compressed air line comprises a pressure switch which is configured to determine a switch position of the respective first control valve and second control valve.

2. The exhaust gas sampling system as recited in claim 1, wherein each pressure chamber is configured to be connected via the respective compressed air line either to a second pressure chamber or a vacuum chamber.

3. The exhaust gas sampling system as recited in claim 1, wherein a control valve is arranged in each compressed air line.

4. The exhaust gas sampling system as recited in claim 1, wherein a flow-through cross-section of the first Venturi nozzle is larger than a flow-through cross-section of the second Venturi nozzle.

5. The exhaust gas sampling system as recited in claim 1, wherein,
the flexible, hose-like control element connects to a pipe section, and
when the first control valve and/or when the second control valve is/are in an open position, the respective flexible, hose-like control element of the first control valve and/or of the second control valve is/are flush with the pipe section.

6. The exhaust gas sampling system as recited in claim 1, wherein,
the first control valve and the second control valve each comprise an inner diameter and each connect to a pipe section,
when the first control valve is in an open position, the inner diameter of the first control valve corresponds to an inner diameter of the pipe section, and
when the second control valve is in an open position, the inner diameter of the second control valve corresponds to an inner diameter of the pipe section.

7. The exhaust gas sampling system as recited in claim 1, further comprising:
a third Venturi nozzle;
a fourth Venturi nozzle;
a third control valve; and
a fourth control valve,
wherein,
the first Venturi nozzle, the second Venturi nozzle, the third Venturi nozzle, and the fourth Venturi nozzle are connected in parallel,
the third Venturi nozzle is assigned the third control valve, and
the fourth Venturi nozzle is assigned the fourth control valve.

8. The exhaust gas sampling system as recited in claim 7, wherein the first Venturi nozzle, the second Venturi nozzle, the third Venturi nozzle and the fourth Venturi nozzle each comprise a different diameter.

9. The exhaust gas sampling system as recited in claim 1, wherein each of the first control valve and the second control valve are arranged downstream of the first Venturi nozzle and the second Venturi nozzle.

\* \* \* \* \*